US008532340B2

(12) United States Patent
Kruglick

(10) Patent No.: US 8,532,340 B2
(45) Date of Patent: Sep. 10, 2013

(54) PROJECTING PATTERNS FOR HIGH RESOLUTION TEXTURE EXTRACTION

(75) Inventor: Ezekiel Kruglick, Poway, CA (US)

(73) Assignee: Empire Technology Development, LLC, Wilmington, DE (US)

( * ) Notice: Subject to any disclaimer, the term of this patent is extended or adjusted under 35 U.S.C. 154(b) by 394 days.

(21) Appl. No.: 13/061,677

(22) PCT Filed: Sep. 30, 2010

(86) PCT No.: PCT/US2010/050863
§ 371 (c)(1),
(2), (4) Date: Mar. 1, 2011

(87) PCT Pub. No.: WO2012/044300
PCT Pub. Date: Apr. 5, 2012

(65) Prior Publication Data
US 2012/0082383 A1 Apr. 5, 2012

(51) Int. Cl.
*G06K 9/00* (2006.01)
*G01B 11/24* (2006.01)
(52) U.S. Cl.
USPC ........... 382/108; 382/100; 382/106; 382/154; 356/605
(58) Field of Classification Search
USPC ................. 382/100, 106, 108, 154; 345/419; 356/605
See application file for complete search history.

(56) References Cited

U.S. PATENT DOCUMENTS

| | | | |
|---|---|---|---|
| 5,852,672 A | 12/1998 | Lu | |
| 6,291,817 B1 | 9/2001 | Kobayashi et al. | |
| 6,690,474 B1 * | 2/2004 | Shirley | 356/603 |
| 6,765,684 B2 * | 7/2004 | Imaizumi | 356/605 |
| 7,050,651 B2 | 5/2006 | Zaklika et al. | |
| 7,119,911 B2 * | 10/2006 | Tyczka et al. | 356/603 |
| 7,157,229 B2 | 1/2007 | Cerrina et al. | |
| 7,212,345 B2 | 5/2007 | Wilson | |
| 7,221,479 B2 | 5/2007 | Wen | |
| 7,256,811 B2 | 8/2007 | To et al. | |
| 7,277,206 B2 | 10/2007 | Trifonov et al. | |
| 7,349,105 B2 | 3/2008 | Weiss | |
| 7,351,507 B2 | 4/2008 | Nozoe et al. | |
| 7,480,061 B2 | 1/2009 | Lee et al. | |
| 7,480,076 B2 | 1/2009 | Wang | |
| 7,545,516 B2 | 6/2009 | Jia et al. | |
| 7,548,324 B2 * | 6/2009 | Lee et al. | 356/605 |
| 7,626,730 B2 | 12/2009 | Tai et al. | |
| 7,675,651 B2 | 3/2010 | Wang et al. | |

(Continued)

OTHER PUBLICATIONS

Chen et al., "One-shot three-dimensional surface profilometry using DMD-based two-frequency Moiré and Fourier Transform technique", International Journal on Smart Sensing and Intelligent Systems, vol. 2, No. 3, Sep. 2009.*

(Continued)

*Primary Examiner* — Anand Bhatnagar
*Assistant Examiner* — Soo Park
(74) *Attorney, Agent, or Firm* — Turk IP Law, LLC

(57) ABSTRACT

Camera-based texture extraction in Augmented Reality (AR) systems is enhanced by manipulating projected patterns. One or more fine line patterns are projected onto a textured surface, a Moiré interference pattern measured, and different properties of the projected pattern(s) adjusted until the Moiré interference pattern measurements indicate that a similar texture pattern to that of the three dimensional target is being projected. Thereby, the target texture may be more closely matched even as sub-pixel resolutions, variable lighting conditions, and/or complicated geometries.

20 Claims, 9 Drawing Sheets

(56) References Cited

U.S. PATENT DOCUMENTS

| | | | |
|---|---|---|---|
| 7,679,787 | B2 | 3/2010 | Wang et al. |
| 7,719,556 | B2 | 5/2010 | To et al. |
| 7,744,263 | B2 | 6/2010 | Bottomley |
| 7,746,502 | B2 | 6/2010 | Yasutomi et al. |
| 2002/0057438 | A1* | 5/2002 | Decker ............... 356/601 |

OTHER PUBLICATIONS

Halioua et al., "Projection moire with moving gratings for automated 3-D topography", Applied Optics, vol. 22, No. 6, Mar. 1983.*

Jin et al., "Shadow moiré profilometry using the phase-shifting method", Opt. Eng 39(8) 2119-2123, Aug. 2000.*

Spagnolo et al., "Digital moiré by a diffractive optical element for deformation analysis of ancient paintings", Journal of Optics A: Pure and Applied Optics 5 (2003), S146-S151, 2003.*

Xie et al., "Effects on absolute moiré contouring by using gratings with different period and profile and rotating angles", Optics and Lasers in Engineering 27 (1997) 247-257, 1997.*

J. Krumm and S. A. Shafer, Segmenting Textured 3D Surfaces Using the Space/Frequency Representation, Spatial Vision 8, No. 2 (1994) 36 pages.

K. W. Bowyer, K. Chang, and P. Flynn, A Survey of Approaches and Challenges in 3D and Multimodal 3D+ 2D Face Recognition, Computer Vision and Image Understanding 101, No. 1 (2006) pp. 1-15.

Proessman Marc et al., Reading between the lines—a Method for Extracting Dynamic 3D with Texture, ACRM VRST (1997) pp. 95-102.

B. B. Chaudhuri and Nirupam Sarkar, Texture Segmentation Using Fractal Dimension, IEEE Trans. Pattern Anal. Mach. Intell. 17, No. 1 (1995) pp. 72-77.

Sixthsense, Integrating Information With the Real World, © 2010, Pranav Mistry http://www.pranavmistry.com/projects/sixthsense/.

B. Verma and S. Kulkarni, Texture Feature Extraction and Classification, School of Information Technology, Griffith University, Gold Coast Campus, Qld 9726, Australia, 2001 http://www.springerlink.com/index/le708bluya8tf0j1.pdf.

Hui Zhang, Jason E. Fritts, Sally A. Goldman, A Fast Texture Feature Extraction Method for Region-based Image Segmentation, 16th Annual Symposium on Image and Video Communication and Processing (2005) SPIE.

J.J. Le Moigne, A.M. Waxman, Structured Light Patterns for Robot Mobility, IEEE Journal of Robotics and Automation (1988).

M. Proesmans, L. Van Gool, One-shot 3D-shape and Texture Acquisition of Facial Data, Lecture Notes in Computer Science; vol. 1206, Proceedings of the First International Conference on Audio- and Video-Based Biometric Person Authentication, Springer-Verlag (1997) pp. 411-418.

Takeda, M. and Mutoh, K., "Fourier transform profilometry for the automatic measurement of 3-D object shapes," Applied Optics, Dec. 15, 1983, vol. 22, Issue 24, pp. 3977-3982.

International Preliminary Report on Patentability issued on Apr. 2, 2013.

"Moiré pattern," last modified on Jun. 12, 2013, accessed at http://en.wikipedia.org/wiki/Moir%C3%A9_pattern, accessed on Jun. 26, 2013, pp. 8.

International Search Report and Written Opinion for International Patent Application No. PCT/US10/50863 mailed Jan. 19, 2011.

* cited by examiner

PROJECTING PATTERNS FOR HIGH RESOLUTION TEXTURE EXTRACTION

CROSS REFERENCE TO RELATED APPLICATIONS

This application claims the benefit of International Patent Application Serial No. PCT/US10/50863 filed on Sep. 30, 2010. The disclosures of the International Patent Application are hereby incorporated by reference for all purposes.

BACKGROUND

Unless otherwise indicated herein, the materials described in this section are not prior art to the claims in this application and are not admitted to be prior art by inclusion in this section.

A variety of applications ranging from visual inspection to autonomous navigation recognize objects in an image and compute their poses in a three dimensional scene. Many such applications employ a pre-stored model of an object for accurate detection. When objects are to be detected without prior information, the task becomes more complex. Objects with textured surfaces render the task of object recognition even more complicated.

Augmented reality (AR) refers to a view of a physical (real) world environment whose elements are augmented by virtual, typically computer-generated, imagery, thereby creating a mixed reality. The augmentation may be conventionally in real time and in context with environmental elements, such as a sporting event, a training exercise, a game, etc. AR technology enables the information about surrounding real world of a person to become interactive and digitally usable by adding object recognition and image generation. Artificial information about the environment and the objects may be stored and retrieved as an information layer separate from a real world view layer.

Texture extraction may be employed for AR to allow more realistic integration or recognition of real world objects. For texture extraction, projected patterns are sometimes used in order to determine the three dimensional shape of objects. These patterns are often called "structured light" and can help extract the three dimensional shape of features on objects such as faces, castings, etc. Conventional systems typically turn off or otherwise subtract out any projected image(s), sometimes removing (or cancelling) a complete three dimensional grid before texture processing. The texture is then calculated by space/frequency analysis on the pixels in the image of the subject as it would be without the projected patterns.

The present disclosure appreciates that there are numerous limitations with texture extraction in AR systems. For example, textures below a resolution capability of a detection device (e.g., a camera) may not be extracted using conventional techniques.

SUMMARY

The present disclosure describes an Augmented Reality (AR) scene capture system capable of high resolution texture extraction. According to some examples, the system may include a projector for projecting one or more fine-lined patterns on a three dimensional subject to be captured, a camera for capturing an image of the subject with the projected patterns, and a processor. The processor may determine a textured portion of the subject, record local Moiré pattern pitches on the textured portion of the subject, and adjust one or more properties of the projected patterns such that the projected patterns substantially match the textured portion of the subject.

The present disclosure further provides a method for high resolution texture extraction in an Augmented Reality (AR) scene capture system. According to some examples, the method may include determining a textured portion of a three dimensional subject to be captured, extracting a three dimensional shape for the textured portion of the subject, and projecting two fine-lined patterns on the textured portion of the subject. According to other examples, the method may further include recording local Moiré pattern images on the textured portion of the subject, selecting two or more Moiré patterns with pitches that are clear in the recorded images, and determining a pattern angle and a spatial frequency.

The present disclosure also describes a computer-readable storage medium having instructions stored thereon for high resolution texture extraction in an Augmented Reality (AR) scene capture system. According to some examples, the instructions may include determining a textured portion of a three dimensional subject to be captured, extracting a three dimensional shape for the textured portion of the subject, projecting two fine-lined patterns on the textured portion of the subject, recording local Moiré pattern images on the textured portion of the subject, and selecting two or more Moiré patterns with pitches that are clear in the recorded images. According to other examples, the instructions may further include determining a pattern angle and a spatial frequency, rotating the projected two fine-lined patterns over each other, and iteratively generating new projected patterns that match a texture of the textured portion of the subject in finer detail and determining a new pattern angle and spatial frequency at each iteration until a predefined pattern knowledge is achieved.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

Figure 1:
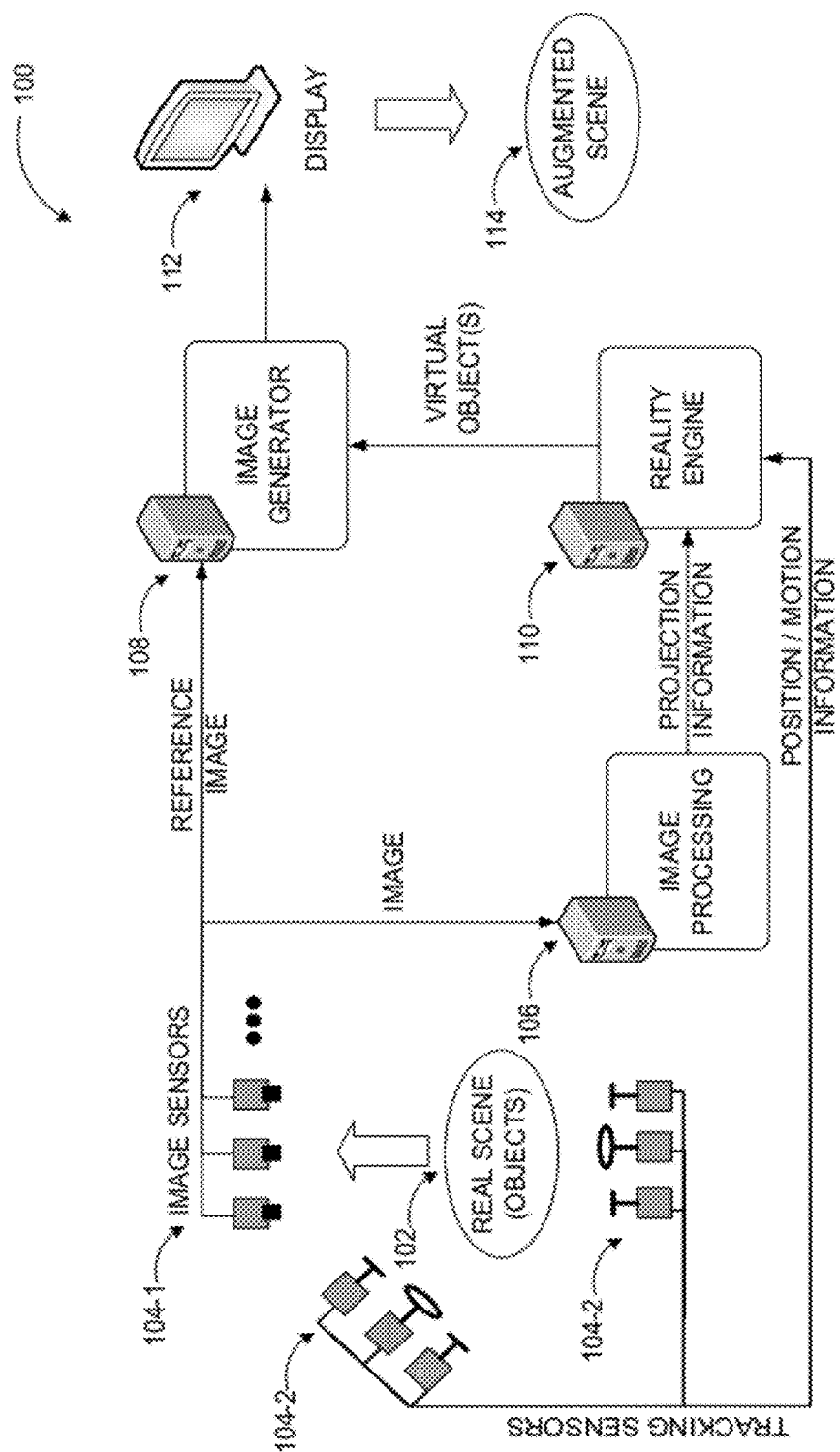
FIG. 1 illustrates an example Augmented Reality (AR) system, where projected patterns may be employed for high resolution texture extraction.

all arranged in accordance with at least some embodiments described herein.

DETAILED DESCRIPTION

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to enhancing texture extraction for augmented reality through manipulation of projected patterns.

Briefly stated, camera-based texture extraction in AR systems may be enhanced by manipulating projected patterns. According to some examples, a fine line pattern may be projected, a Moiré interference pattern measured, and different properties of the projected pattern adjusted until the Moiré interference pattern measurements indicate that a similar texture pattern to that of the three dimensional target is being projected. Thereby, the target texture may be more closely matched even as sub-pixel resolutions.

FIG. 1 illustrates an example Augmented Reality (AR) system, where projected patterns may be employed for high resolution texture extraction arranged in accordance with at least some embodiments described herein. AR explores the application of computer-generated imagery in live video streams to expand the real world presentation. Example AR systems arranged in accordance with the present disclosure may be in controlled environments containing a number of sensors and actuators, may include one or more computing device adapted to process real and computer-generated imagery, and may include visualization systems such as head-mounted displays, virtual retinal displays, monitor or similar regular displays, and comparable devices.

Example AR system 100 includes image sensors 104-1 for capturing live images of real scene (objects) 102, as well as tracking sensors 104-2 for tracking a position and/or a motion of the objects. The image sensors 104-1 may be digital cameras, webcams, or some other image capturing devices. The tracking sensors 104-2 may include a number of receiving devices arranged in a passive sensing network to enhance tracking performance through frequency, bandwidth, and spatial diversity of the network. The receiving devices (e.g., one or more RF receivers) may be adapted to utilize communication signals (e.g., electromagnetic waves such as RF signals) from nearby signal sources such as communication towers (e.g., cellular telephony communication towers) or communication base stations. The tracking sensors 104-2 may be located in different positions and may be communicatively coupled to a centralized or distributed computing system to form the collaborative network.

The captured image(s) may be provided to an image processing sub-system 106, which may be adapted to perform one or more of digitization of images into digital images, receipt of digital images, and/or processing digital images. Processing of digital images may include one or more of determining locations of feature points in the images, computation of affine projections, tracking of edges, filtering, and/or similar operations. Image processing sub-system 106 may be configured to provide projection information, such as one or more of the results of the above described operations, to reality engine 110. The tracking sensors 104-2 may be configured to provide position and/or motion information associated with objects of interest in real scene 102 to the reality engine 110. The reality engine 110 may be adapted to execute a graphics process to render scenes based on the captured images that incorporates position and/or motion information from the tracking sensors 104-2.

Image generator 108 may be adapted to receive reference image(s) from the image sensors 104-1 as well as image data associated with virtual object(s), and may be adapted to overlay the captured real scene images with the image data associated with the virtual object(s) to provide an augmented scene 114. Display 112 is one example of a visualization mechanism that may be utilized in the AR system 100. A number of other display types, such as projectors, wearable displays, etc. may also be used to present the AR imagery to a user.

Processing for at least some of the components of the AR system 100 such as the image processing sub-system 106, the reality engine 110, the image generator 108, and/or the display 112 may be performed by separate applications, one or more integrated applications, one or more centralized services, or one or more distributed services on one or more computing devices. Each computing device may be either a general purpose computing devices or a special purpose computing device that may be a standalone computer, a networked computer system, a general purpose processing unit (e.g., a micro-processor, a micro-controller, a digital signal processor or DSP, etc.), or a special purpose processing unit. If executed on different computing devices, various components of the AR system 100 may be adapted to communicate over one or more networks.

Figure 2:
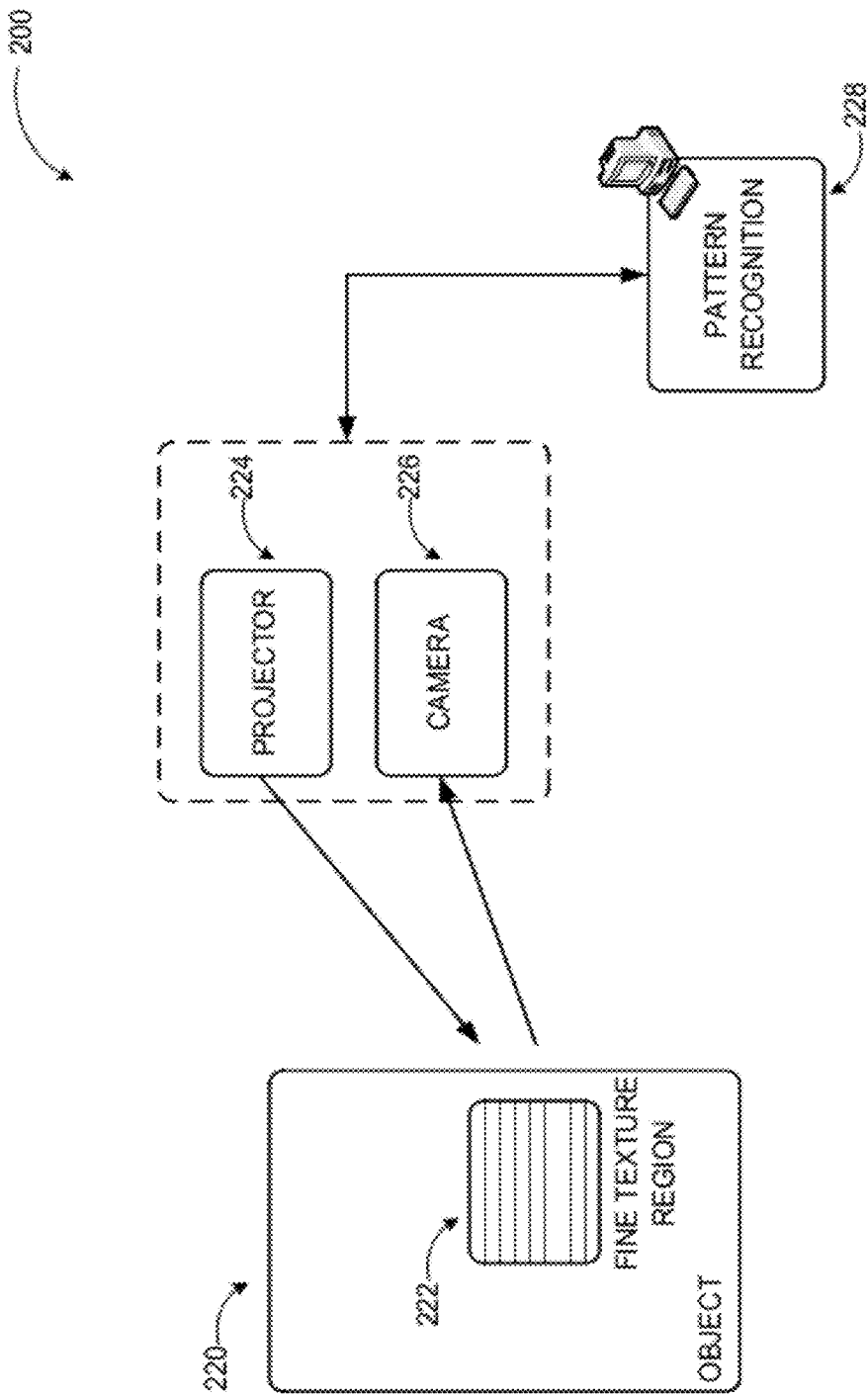
FIG. 2 illustrates an example pattern projection and capture system for high resolution texture extraction.

FIG. 2 illustrates an example pattern projection and capture system for high resolution texture extraction arranged in accordance with at least some embodiments described herein. Three dimensional feature extraction systems typically include a camera 226, a projector 224, and image processing capabilities (pattern recognition program 228) as shown in diagram 200.

A system according to at least some embodiments may employ these components to project a pattern onto a fine textured surface 222 of an object 220 to enhance the visibility of textures by manipulating projected patterns. The projector 224 may project a fine line pattern onto the textured surface 222. The camera 226 may capture an image of the textured surface 222 with the projected pattern. Pattern recognition program 228 may measure a Moiré interference pattern and adjust different properties of the projected pattern until the Moiré interference pattern measurements indicate that a similar texture pattern to that of the three dimensional target (object 220) is being projected.

According to at least some embodiments, a mobile device or similar mechanism may be utilized to move the projector 224 for adjusting features of the projected pattern such as an angle of orientation, a width of projected lines, a compensation for surface coloration or three dimensional features, and similar ones. The resulting changes in the Moiré interference pattern image may be used to extract the pitch and orientation of the sub-pixel texture pattern enhancing obtained texture information. By modifying the patterns, a spatially varying texture may also be sequentially extracted. Beyond sub-resolution patterns, a system according to embodiments may also be employed to analyze textures under variable lighting conditions or complicated geometries. In some example implementations, the projector 224 and the camera 226 may be integrated or installed on the same platform (e.g., a handheld device, a vehicle-mount device, etc.) as shown in diagram 200.

Figure 3:
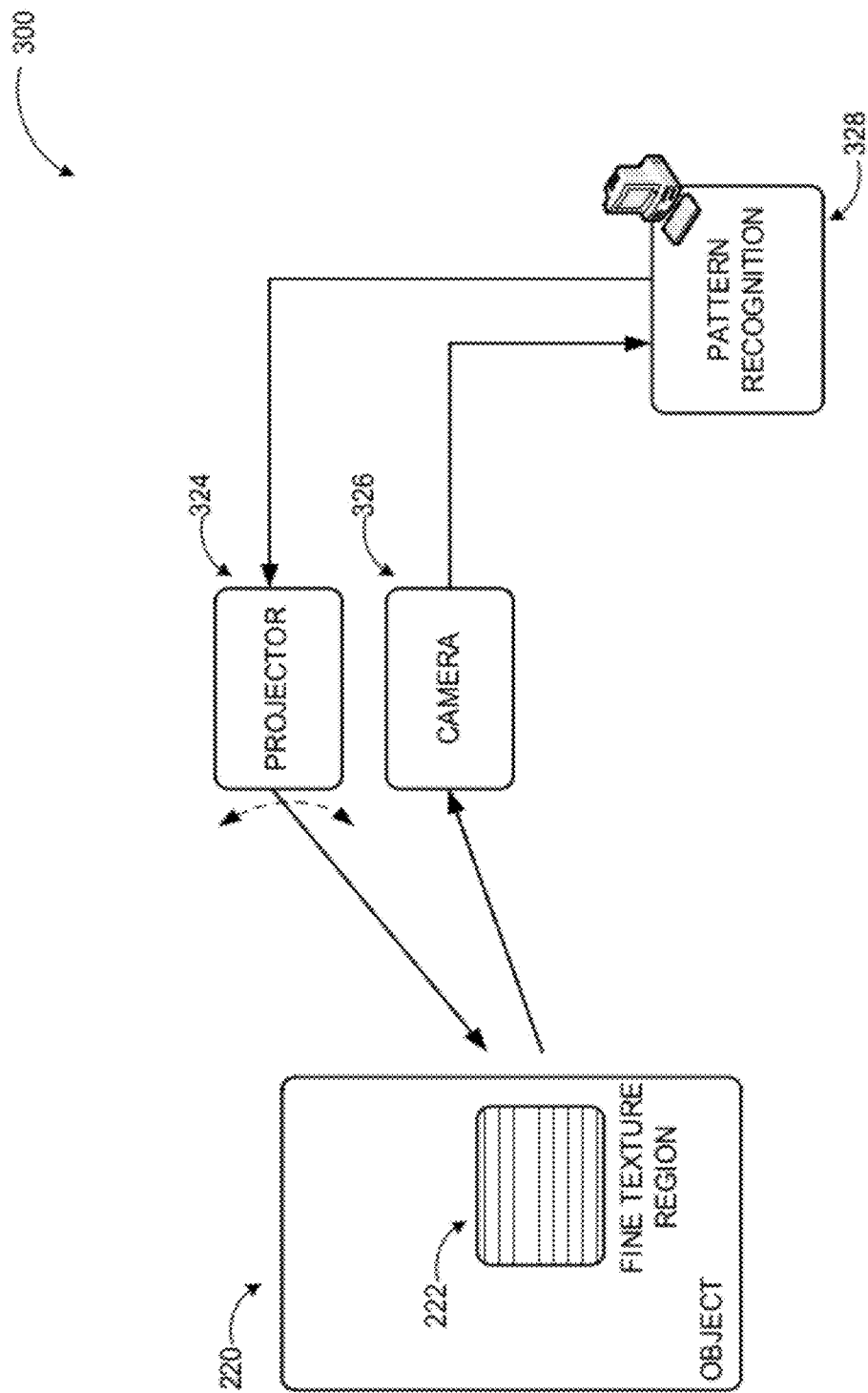
FIG. 3 illustrates another example pattern projection and capture system for high resolution texture extraction.

FIG. 3 illustrates another example pattern projection and capture system for high resolution texture extraction arranged in accordance with at least some embodiments described herein. Major components of a system for high resolution texture extraction for an AR environment depicted in diagram 300 may be similarly configured and perform likewise tasks as similarly numbered components in diagram 200 of FIG. 2. Differently from FIG. 2, projector 324 and camera 326 are independent in the system of diagram 300. Thus, the camera 326 may capture images of the textured surface 222 from a fixed perspective, while the projector 324 is moved to adjust properties of the projected pattern such as orientation of the lines. Pattern recognition program 328 may control the movements of the projector 324 automatically according to some example implementations.

Texture extraction by a system according to embodiments may begin with extracting a rough estimate of the three dimensional texture from a three dimensional feature computation. According to other examples, the surface may be assumed to be relatively planar. Alternatively, the projection may be three dimensionally corrected so that the computations may be performed at camera perspective as if the surface is nearly planar.

Projection of lines with a different pitch than the texture results in a high frequency visual component, which may be sub-pixel resolution, and a low frequency visual component, which is at a spatial frequency of half the difference between the spatial frequencies of the two patterns. For example, if a corduroy fabric surface has about 2 mm pitch (spatial frequency of about 5 cm$^{-1}$) and a projected pattern has lines with a pitch of about 3 mm (spatial frequency of about 3.3 cm$^{-1}$), a virtual pattern in the aligned state may emerge at about 0.85 cm$^{-1}$ or about 1.17 cm pitch—a size easier to see with a camera. This virtual pattern may then change with rotation in a way that provides more equations than unknowns so that true texture pitch and angle can be extracted.

Figure 4:
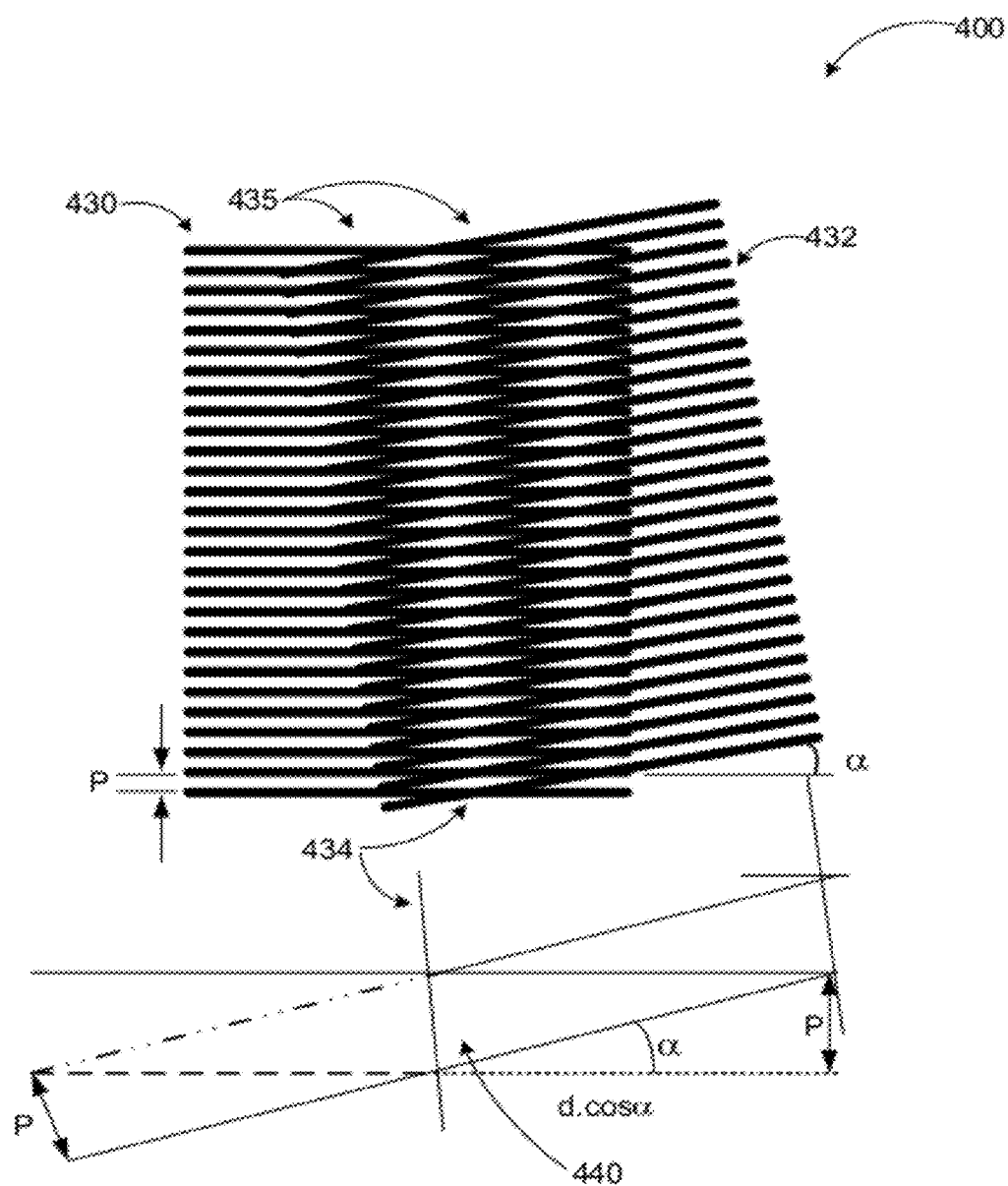
FIG. 4 illustrates how patterns below the resolution of a camera may be discerned employing two sets of similar lines at an angle and rotating the line sets.

FIG. 4 illustrates how patterns below the resolution of a camera may be discerned employing two sets of similar lines at an angle, or one set of lines plus the texture of a material, and rotating the line sets arranged in accordance with at least some embodiments described herein. A typical Moiré pattern is made of an array of parallel lines, at approximately pixel width. The pattern interacts with the texture elements at a sub-pixel level, creating a Moiré interference pattern. By tilting the pattern (both in displacement as well as in rotation), the alignment, pitch, and/or shape of the sub-resolution texture can be determined.

Diagram 400 includes an example, where a projected first pattern 430 of parallel lines is rotated into a second pattern 432 compared against a pattern on the object texture to enhance texture extraction. Both patterns have the distance between lines p. The second pattern 432 is rotated by an angle α. From a distance, dark and pale lines (435, 434) can be seen.

The pale lines 434 correspond to the lines of nodes, that is, lines passing through the intersections of the two patterns 430 and 432. If each cell 440 of the "net" formed by the intersecting patterns is a parallelogram with the four sides equal to d=p/sin α. Each cell includes a right triangle with hypotenuse d and side p opposing the angle α. It should be noted that this type of pattern generation is in addition to the effect of varying pitch and both approaches together can be used to generate a pattern revealing smaller patterns as discussed below.

Sets of similar lines at an angle create a virtual pattern with larger features than either pattern. If one pattern is the surface texture and the other is a projected pattern, the projection enables the discerning of patterns that may be below the resolution of the camera. The virtual pattern changes during rotation of the projection so that the true surface pattern may be extracted. If the true surface pattern is not formed by straight lines, the patterns may change in different areas at different times and this may be used to extract the orientation and pitch of the pattern in each area.

The pale lines 434 correspond to the small diagonal of the rhombus. As the diagonals are the bisectors of the neighboring sides, the pale lines have an angle equal to α/2 with the perpendicular of the lines of each pattern. Additionally, the spacing between two pale lines is D, the half of the big diagonal. The big diagonal 2D is the hypotenuse of a right triangle and the sides of the right angle are d·(1+cos α) and p. Using the Pythagorean Theorem:

$$(2D)^2 = d^2 \cdot (1+\cos \alpha)^2 + p^2, \qquad [1]$$

which can be transformed into:

$$(2D)^2 = 2p^2 \cdot (1+\cos \alpha)/\sin^2 \alpha. \qquad [2]$$

When α is very small (α<p/6), two approximations may be made: sin α≈α and cos α≈1. Thus:

$$D = p/\alpha, \qquad [3]$$

where α is in radians.

As α becomes smaller (patterns less rotated), the pale lines 434 become farther apart. When both patterns 430 and 432 are parallel (i.e., α=0), the spacing between the pale lines becomes infinite (i.e., there is no pale line). A camera with lower resolution than the texture can have lines (dark and light) to recognize even though the actual texture and Moiré pattern may be irresolvable grey. α may be determined using two different techniques: by the orientation of the pale lines 434 and by their spacing (α=p/D).

If the angle is measured, the final error may be proportional to the measurement error. If the spacing is measured, the final error may be proportional to the inverse of the spacing. Thus, for smaller angles, measuring the spacing may yield more accurate results. Moreover, multiple sets of virtual patterns may be obtained by varying the frequency and/or angle of the projected lines. Two patterns are required to extract the underlying texture size with certainty as there are high and low frequency virtual patterns as discussed above.

Figure 5:
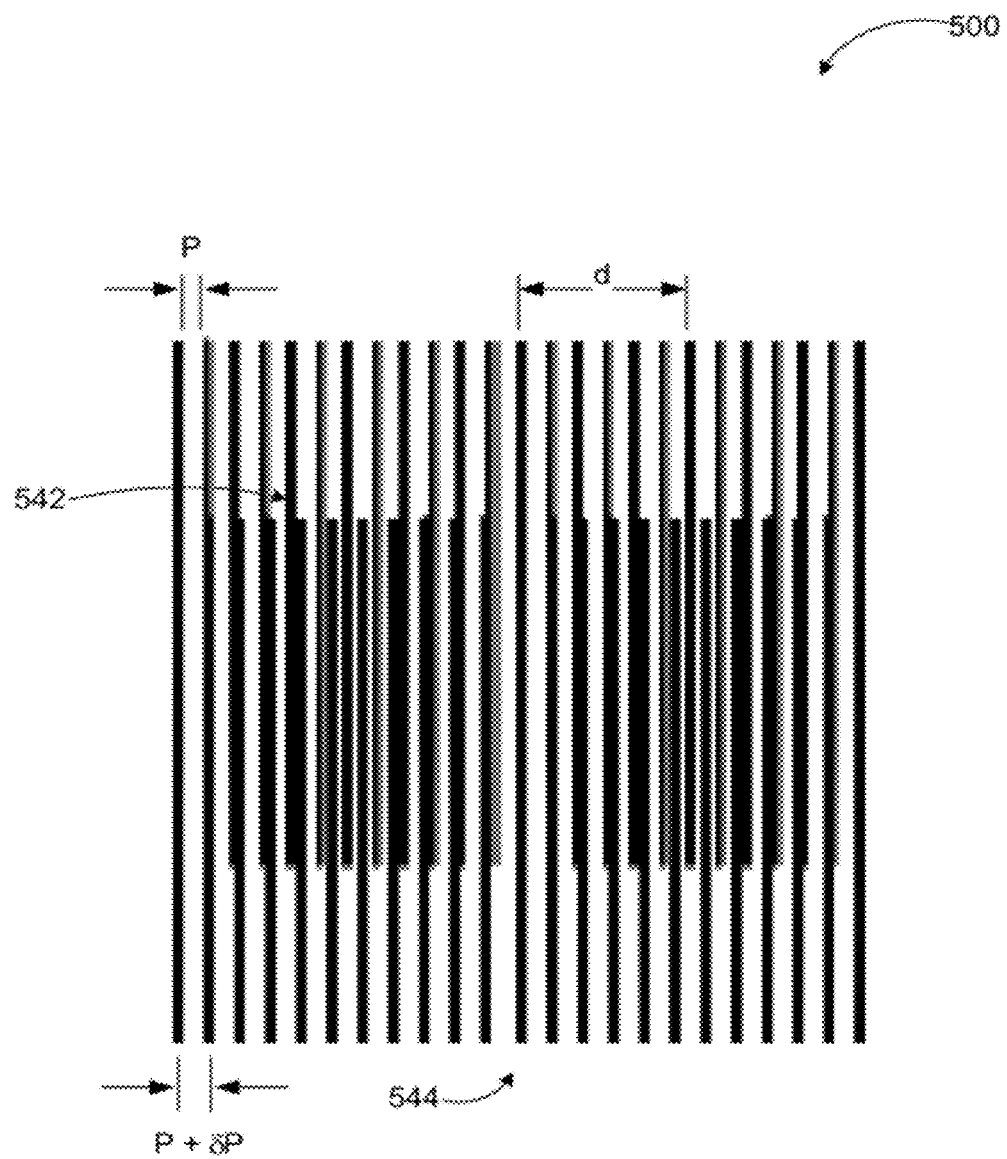
FIG. 5 illustrates a geometric approach to high resolution texture extraction employing two superimposed patterns of parallel and equidistant lines.

FIG. 5 illustrates a geometric approach to high resolution texture extraction employing two superimposed patterns of parallel and equidistant lines arranged in accordance with at least some embodiments described herein. According to some embodiments, a geometric approach may be employed in texture extraction. Diagram 500 illustrates two patterns 542 and 544 formed by parallel and equidistant lines. The lines of the first pattern 544 are separated by p and the lines of the second pattern 542 are separated by p+δp, where δ has a value between 0 and 1.

If the lines of the patterns are superimposed at the left portion of the figure, the shift between the lines increases when going to the right. After a number of lines, the patterns are opposed (i.e., the lines of the second pattern 542 are between the lines of the first pattern 544). From a far distance, pale zones become visible when the lines are superimposed (white area between the lines) and dark zones when the lines are "opposed". The middle of the first dark zone appears when the shift is equal to p/2. The nth line of the second pattern 542 is shifted by n·δp compared to the nth line of the first pattern. The middle of the first dark zone thus corresponds to:

$$n \cdot \delta p = p/2, \quad [4]$$

from which n can be expressed as:

$$n = p/(2\delta p). \quad [5]$$

The distance d between the middle of a pale zone and a dark zone can then be expressed as:

$$d = n \cdot p = p^2/(2\delta p). \quad [6]$$

Thus, the distance between the middle of two dark zones, which is also the distance between two pale zones, can be expressed as:

$$2d = p^2/(\delta p). \quad [7]$$

From formula [7], one can deduce that the bigger the separation between the lines, the bigger the distance between the pale and dark zones and the bigger the discrepancy δp, the closer the dark and pale zones. A great spacing between dark and pale zones means that the patterns have very close line distances. When p=p/2, a uniformly grey figure is obtained with no contrast.

According to other embodiments, an interferometric approach may also be employed. For the interferometric approach, two transparent patterns with a contrast I that varies with a sinusoidal law may be considered:

$$I_1(x) = I_0 \cdot \sin(2\pi k_1 x) \quad [8]$$

$$I_2(x) = I_0 \cdot \sin(2\pi k_2 x), \quad [9]$$

where
the distances between the lines of the patterns are respectively $p_1 = 1/k_1$ and $p_2 = 1/k_2$. When the patterns are superimposed, the resulting intensity (or interference) may be expressed as:

$$I(x) = I_0 \cdot [\sin(2\pi k_1 x) + \sin(2\pi k_1 x)]. \quad [10]$$

Using Euler's formula, the interference may be expressed as:

$$I(x) = I_0 \cdot 2 \cos(2\pi x(k_1 - k_2)/2) \cdot \sin(2\pi x(k_1 + k_2)/2. \quad [11]$$

The resulting intensity includes a sinusoid of a high "spatial frequency" (wave number), which is the average of the spatial frequencies of the two patterns, and a sinusoid of a low spatial frequency, which is the half of the difference between the spatial frequencies of the two patterns. The second component is an "envelope" for the first sinusoid. The wavelength of this component is the inverse of the spatial frequency:

$$1/\lambda = (k_1 - k_2)/2 \cdot (1/p_1 - 1/p_2)/2. \quad [12]$$

If $p_1$ and $p_2$ are written in δp form as $p_1 = p$ and $p_2 = p + \delta p$, the wavelength can be expressed as:

$$\lambda = 2 \cdot p_1 p_2/(p_2 - p_1) \approx p^2/2\delta p. \quad [13]$$

The distance between the zeros of this envelope is spaced by l/2, and the maxima of amplitude are also spaced by l/2. Thus, the same results as the geometric approach may be obtained with a discrepancy of p/2, which is the uncertainty linked to the reference that is considered first pattern or second pattern. The discrepancy becomes negligible when δp<<p. Thus, angle data is not necessarily needed for the three different approaches (e.g. it is known that the target has vertical lines). The projected image may be employed as one of the patterns.

Figure 6:
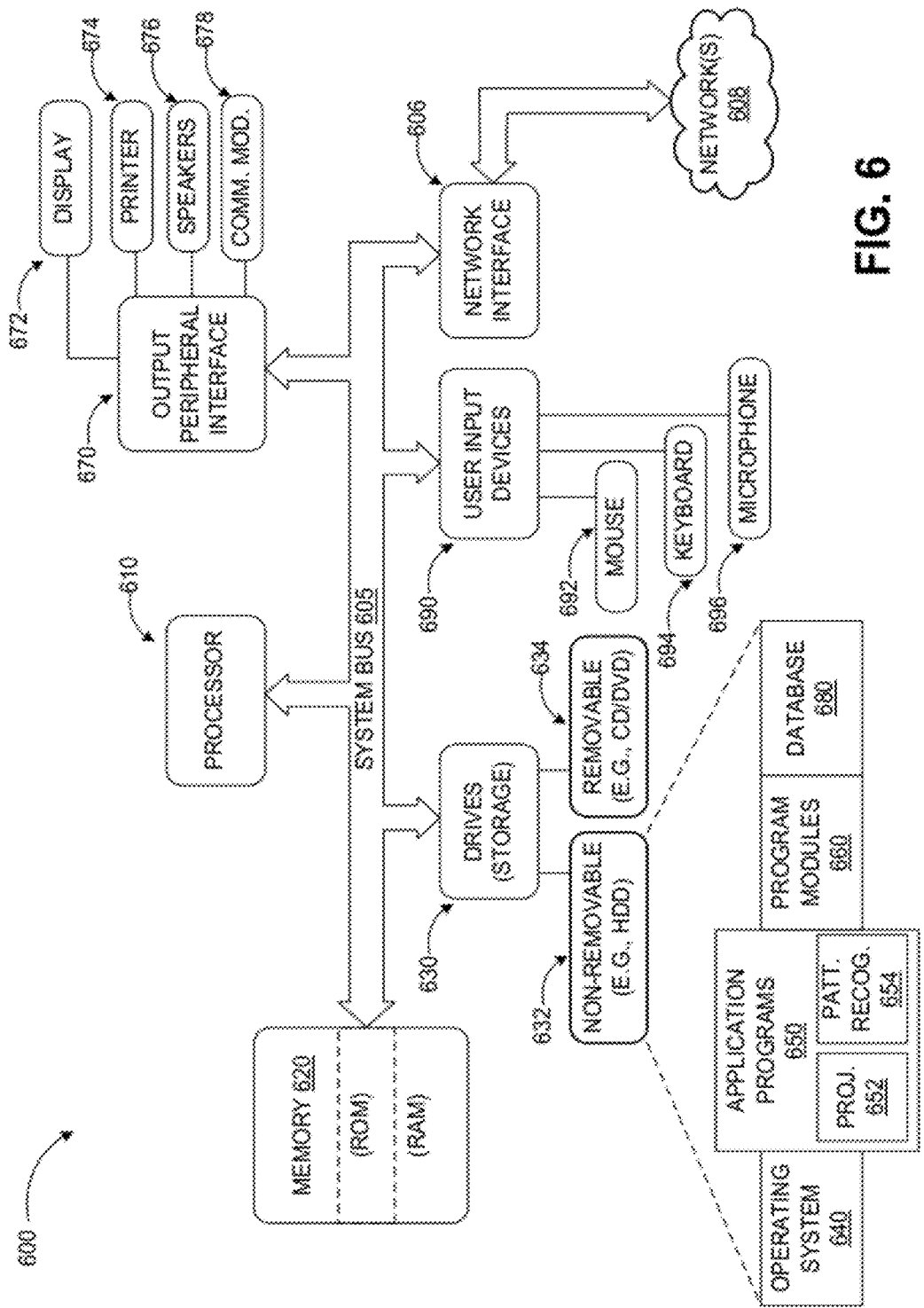
FIG. 6 illustrates a general purpose computing device, which may be used to extract high resolution texture information employing projected patterns.

FIG. 6 illustrates a general purpose computing device, which may be used to extract high resolution texture information employing projected patterns arranged in accordance with at least some embodiments described herein.

Computer 600 includes a processor 610, a memory 620, and one or more drives 630. The drives 630 and their associated computer storage media such as removable storage media 634 (e.g., CD-ROM, DVD-ROM) and non-removable storage media 632 (e.g., a hard drive disk), may provide storage of computer readable instructions, data structures, program modules and other data for the computer 600. The drives 630 may include an operating system 640, application programs 650, program modules 660, and database 680. The computer 600 further may include user input devices 690 through which a user may enter commands and data. The input devices 690 may include an electronic digitizer, a microphone 696, a keyboard 694, and a pointing device such as a mouse device 692, trackball device or touch pad device. Other input devices may include a joystick device, game pad device, satellite dish, scanner device, or the like.

The application programs 650 may include a projection application 652 and a pattern recognition application 654. The projection application 652 may generate, modify, and/or control projection of pattern sets on textured surfaces to extract texture from three dimensional objects in AR applications. The pattern recognition application 654 may process captured images compute Moiré interference patterns and provide feedback to the projection application 652 in order to adjust the patterns and enhance the obtained information iteratively.

The above described and other input devices may be coupled to a processor 610 through a user input interface that is coupled to a system bus 605, but may be coupled by other interface and bus structures, such as a parallel port, game port or a universal serial bus (USB). Computers such as the computer 600 may also include other peripheral output devices such as speakers 676, printer 674, display 672, and communication module 678, which may be coupled through an output peripheral interface 670 or the like. The communication module 678 may be used to communicate with a projector and/or a mobile platform controlling the projector to adjust different properties of the projected patterns.

The memory 620, removable storage devices 634 and non-removable storage devices 632 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computer 600. Any such computer storage media may be part of the computer 600.

The computer 600 may operate in a networked environment using logical connections to one or more computers, such as a remote computer connected to network interface 606. The remote computer may be a personal computer, a server, a router, a network PC, a peer device or other common network node, and can include many or all of the elements described above relative to the computer 600. Networking environments are commonplace in offices, enterprise-wide area networks (WAN), local area networks (LAN), intranets and world-wide networks such as the Internet. For example, in the subject matter of the present application, the computer 600 may comprise the controller machine from which data is being migrated to multilayer circuit board manufacturing systems such as automatic drill systems, etching systems, etc., and the remote computer may comprise controllers of the systems. It should be noted, however, that source and destination machines need not be coupled together by a network(s) 608 or any other means, but instead, data may be migrated via any media capable of being written by the source platform and read by the destination platform or platforms. When used in a LAN or WLAN networking environment, computer 600 may be coupled to the LAN through the network interface 606 or an adapter.

The network(s) may comprise any topology employing servers, clients, switches, routers, modems, Internet service providers (ISPs), and any appropriate communication media (e.g., wired or wireless communications). A system according to some embodiments may have a static or dynamic network topology. The network(s) may include a secure network such as an enterprise network (e.g., a LAN, WAN, or WLAN), an unsecure network such as a wireless open network (e.g., IEEE 802.11 wireless networks), or a world-wide network such as (e.g., the Internet). The network(s) may also comprise a plurality of distinct networks that are adapted to operate together. The network(s) are adapted to provide communication between the nodes described herein. By way of example, and not limitation, the network(s) may include wireless media such as acoustic, RF, infrared and other wireless media.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computer 600 may be implemented as a portion of a small-form factor portable (or mobile) electronic device such as a portable computing device, a mobile computing device, an application specific device, or a hybrid device that include any of the above functions. The computer 600 may also be implemented as a personal computer including both laptop computer and non-laptop computer configurations. Moreover, the computer 600 may be implemented as a networked system or as part of a general purpose or specialized server.

Figure 7:
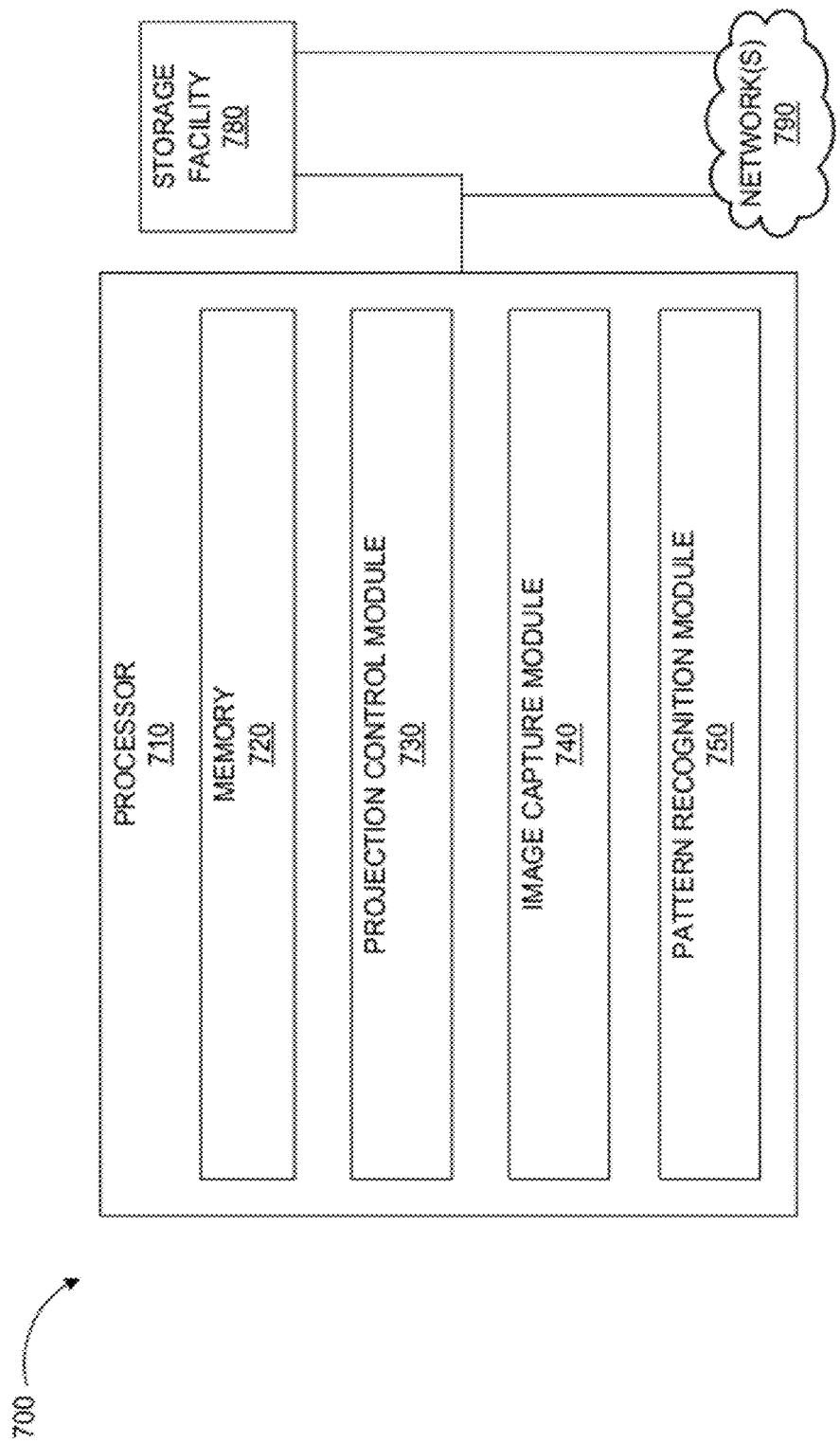
FIG. 7 illustrates a processor, which may be used to extract high resolution texture information employing projected patterns.

FIG. 7 illustrates a processor, which may be used to extract high resolution texture information employing projected patterns arranged in accordance with at least some embodiments described herein. Processor 710 of diagram 700 may be part of a computing device communicatively coupled to one or more modules responsible for projecting patterns onto a textured surface of an object to be recognized, extracting texture(s) from the projected surfaces, adjusting projection parameters, etc.

The processor 710 may include a number of modules for controlling different aspects of projecting patterns for high resolution texture extraction. The modules may include a projection control module 730 for projecting fine line patterns with adjustable parameters onto a textured surface, an image capture module 740 for capturing images of the textured surface with the projected patterns, and a pattern recognition module 750 for processing captured images, measuring Moiré interference patterns, and adjusting projected patterns for finer detection.

Memory 720 may be configured to store instructions for the control modules of the processor 710, which may be implemented as hardware, software, or combination of hardware and software. The processor 710 may communicate through direct electrical coupling or through networked communications (e.g., network(s) 790) with other computing devices and/or data stores such as storage facility 780.

Example embodiments may also include methods. These methods can be implemented in any number of ways, including the structures described herein. One such way is by machine operations, of devices of the type described in the present disclosure. Another optional way is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

Figure 8:
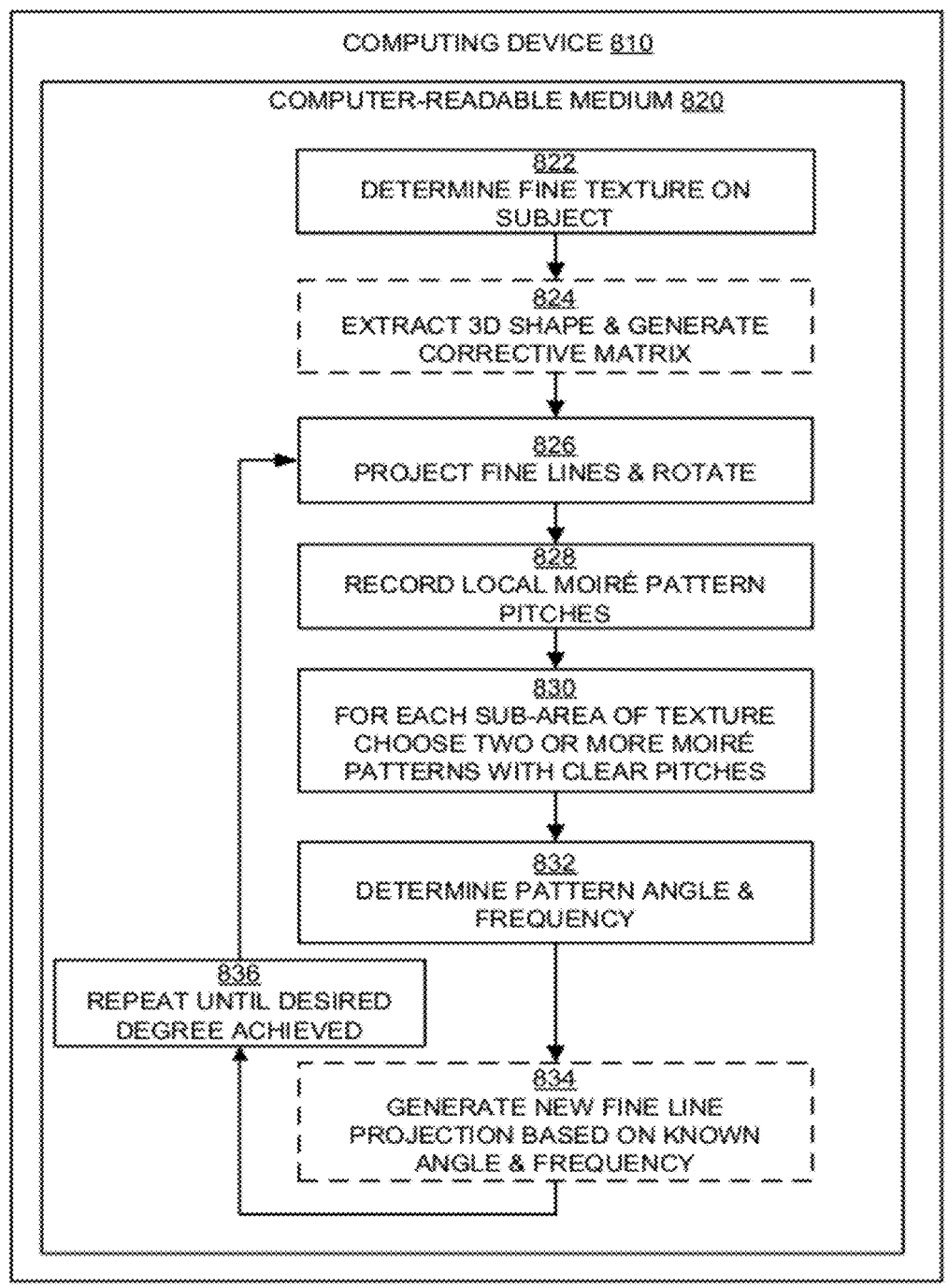
FIG. 8 is a flow diagram illustrating an example method for texture extraction that may be performed by a computing device, such as computer 600 in FIG. 6 or special purpose processor 710 in FIG. 7.

FIG. 8 is a flow diagram illustrating an example method for texture extraction that may be performed by a computing device, such as the computer 600 in FIG. 6 or the processor 710 in FIG. 7 in accordance with at least some embodiments. The operations described in blocks 822 through 836 may be stored as computer-executable instructions in a computer-readable medium such as the drives 640 of the computer 600 or the memory 720 of the processor 710.

A process of high resolution texture extraction by projecting patterns may begin with operation 822, "DETERMINE FINE TEXTURE SUBJECT." At operation 822, a three dimensional object to be modeled for an AR system may be determined along with fine textured surfaces of the object. A camera such as the camera 226 of FIG. 2 may be used to detect the object. The textured surface of the object may have multiple orientations and pitches. Furthermore, the system may be positioned such that a projector (e.g., the projector 224) of the system can project predefined and adjustable patterns on the fine textured surfaces.

At optional operation 824, "EXTRACT 3D SHAPE AND GENERATE CORRECTIVE MATRIX", the three dimensional shape of the object may be extracted, possibly using three dimensional structured light techniques incompatible with conventional texture extractions. The three dimensional shape may be used to generate a correction matrix for the following operations to compensate for three dimensional shape.

At operation 826, "PROJECT FINE LINES AND ROTATE", following operation 824, projector 224 may project a fine lined pattern such as pattern 430 and rotate it. The fine lines may be straight, bent, or curved lines depending on a surface shape of the object (e.g., curved lines for curved objects). At subsequent operation 828, "RECORD LOCAL MOIRÉ PATTERN PITCHES", the Moiré pitches may be recorded. As discussed previously, a typical Moiré pattern 500 is made of an array of parallel lines, at approximately pixel width. The pattern interacts with the texture elements at a sub-pixel level, creating a Moiré interference pattern. By tilting the pattern (both in displacement as well as in rotation), the alignment, pitch, and shape of the sub-resolution texture can be determined.

At operation 830, "FOR EACH SUB-AREA OF TEXTURE CHOOSE TWO OR MORE MOIRÉ PATTERNS WITH CLEAR PITCHES", following operation 828, the system may choose at least two images for each sub-area that contain clear Moiré patterns. The selection may be performed sequentially or with different colors as long as they are separable. At next operation 832, "DETERMINE PATTERN ANGLE AND FREQUENCY", the system may compute spatial frequency and pattern orientation for each sub area as discussed above. Optionally, the resulting information on pattern pitch and angle may be used to build a new set of fine lines that more closely match the texture 222 of the object 220 at operation 834, "GENERATE NEW FINE LINE PROJECTION BASED ON KNOWN ANGLE AND FREQUENCY." The new pattern may be projected by projector 224 onto the textured surface for a new set of measurements by the camera 226 and the pattern recognition program 228 in an iterative manner as shown by operation 836, "REPEAT UNTIL DESIRED DEGREE ACHIEVED." This iterative cycle of projecting the pattern and re-measuring may evolve to closely match complicated curving or changing patterns such that even complex texture patterns at sub-resolution sizes such as engraving or intaglio may be extracted.

According to other embodiments, additional modifications may be performed. Such modifications may include, but are not limited to, adjusting the width of the projected lines, adjusting the linear shape of the lines to account for curvature in the feature which may be detected by shifts in the virtual line patterns, curving the pattern to account for their expected distortion given the known three dimensional contour of the surface having the texture of interest, and/or curving the pattern to match detected curvature in the texture. The captured Moiré interference pattern may then be converted to a sub-resolution imputed texture map, which can be further analyzed using a variety of texture classification techniques.

The operations included in the above described process are for illustration purposes. High resolution texture extraction in AR systems using pattern projection and capture may be implemented by similar processes with fewer or additional operations. In some examples, the operations may be performed in a different order. In some other examples, various operations may be eliminated. In still other examples, various operations may be divided into additional operations, or combined together into fewer operations.

Figure 9:
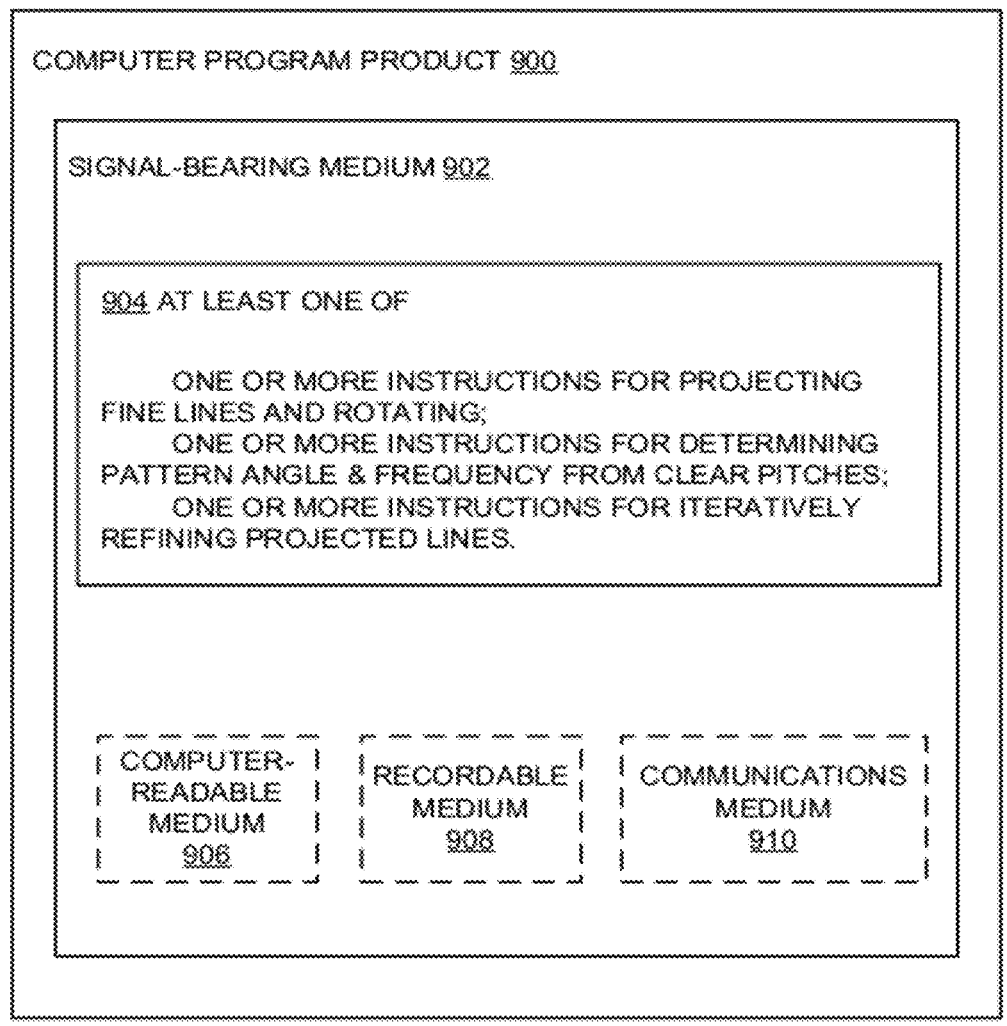
FIG. 9 illustrates a block diagram of an example computer program product.

FIG. 9 illustrates a block diagram of an example computer program product arranged in accordance with at least some embodiments described herein. In some examples, as shown in FIG. 9, computer program product 900 may include a signal bearing medium 902 that may also include machine readable instructions 904 that, when executed by, for example, a processor, may provide the functionality described above with respect to FIG. 6 and FIG. 7. Thus, for example, referring to the processor 710, the modules 730, 740, and 750 may undertake one or more of the tasks shown in FIG. 9 in response to instructions 904 conveyed to the processor 710 by the medium 902 to perform actions associated with controlling high resolution texture extraction through projected patterns as described herein. Some of those instructions may include projecting fine lines and rotating, determining pattern angle and frequency from clear or dark pitches, and iteratively refining the projected lines.

In some implementations, the signal bearing medium 902 depicted in FIG. 9 may encompass a computer-readable medium 906, such as, but not limited to, a hard disk drive, a Compact Disc (CD), a Digital Video Disk (DVD), a digital tape, memory, etc. In some implementations, signal bearing medium 902 may encompass a recordable medium 908, such as, but not limited to, memory, read/write (R/W) CDs, R/W DVDs, etc. In some implementations, the signal bearing medium 902 may encompass a communications medium 910, such as, but not limited to, a digital and/or an analog communication medium (e.g., a fiber optic cable, a waveguide, a wired communications link, a wireless communication link, etc.). Thus, for example, program product 900 may be conveyed to one or more modules of the processor 910 by an RF signal bearing medium, where the signal bearing medium 902 is conveyed by a wireless communications medium 910 (e.g., a wireless communications medium conforming with the IEEE 802.11 standard).

The present disclosure presents an augmented Reality (AR) scene capture system capable of high resolution texture extraction. According to some embodiments, the system may include a projector 224 configured to project at least one fine-lined pattern 430 on a three dimensional subject to be captured, a camera 226 configured to capture an image of the subject with the projected patterns, and a processor 910. The processor may determine a textured portion of the subject 222, record local Moiré pattern pitches on the textured portion of the subject 828, and adjust one or more properties of the projected patterns such that the at least one projected patterns 430 substantially match the textured portion of the subject 222.

According to other embodiments, the properties of the at least one projected pattern 430 may include an angle of orientation, a width, a compensation for surface coloration, and/or a three dimensional feature. The processor 910 may extract a pitch and an orientation of a texture pattern of the textured portion 222 of the subject from changes in the Moiré patterns. Furthermore, the camera 226 and the projector 224 may be integrated into a mobile device whose motion is controlled by the processor 910.

According to further embodiments, the processor may vary the at least one projected fine-lined pattern 430 for sequential extraction of spatially varying texture on the textured portion 222 of the subject, and adjust the properties of the projected pattern 430 in order to capture the textured portion 222 of the subject under varying lighting conditions. The projected pattern 430 may include parallel lines, where the processor adjusts a linear shape of the lines to account for curvature in a feature of the textured portion 222 of the subject. The processor may also curve the projected pattern 430 to account for an expected distortion based on a three dimensional contour of a surface of the textured portion 222 of the subject. Moreover, the processor may curve the projected patterns to match a detected curvature in a texture of the textured portion 222 of the subject.

The present disclosure also presents a method for high resolution texture extraction in an Augmented Reality (AR) scene capture system 100. The method may include determining a textured portion of a three dimensional subject to be captured 822, extracting a three dimensional shape for the textured portion of the subject 824, projecting a fine-lined pattern on the textured portion of the subject 826, recording local Moiré pattern images on the textured portion of the subject 828, selecting two or more Moiré patterns with pitches that are clear in the recorded images 830, and determining a pattern angle and a spatial frequency 832.

According to further examples, the method may further include generating a new projected pattern that matches a texture of the textured portion of the subject in finer detail employing the pattern angle and the spatial frequency 834 and iteratively generating new projected patterns that match a texture of the textured portion of the subject in finer detail and determining a new pattern angle and spatial frequency at each iteration until a predefined pattern knowledge is achieved 836.

According to yet other examples, the method may also include generating a corrective matrix based on the extracted three dimensional shape for the textured portion of the subject 824 and rotating the projected fine-lined pattern over the textured portion. The projected fine-lined pattern 430 may have a different pitch than that of a texture of the textured portion 222 of the subject providing a high frequency visual component and a low frequency visual component. The high frequency visual component may provide a sub-pixel resolution and the low frequency visual component may provide a spatial frequency of about half a difference between spatial frequencies of the projected patterns 430, 432 and the texture of the textured portion 222 of the subject.

The present disclosure further presents a computer-readable storage medium 906 having instructions 904 stored thereon for high resolution texture extraction in an Augmented Reality (AR) scene capture system 100. According to some examples, the instructions may include determining a textured portion of a three dimensional subject to be captured 822, extracting a three dimensional shape for the textured portion of the subject 824, projecting two fine-lined patterns on the textured portion of the subject 826, recording local Moiré pattern images on the textured portion of the subject 828, selecting two or more Moiré patterns with pitches that are clear in the recorded images 830, and determining a pattern angle and a spatial frequency 832. According to other examples, the projected patterns may be projected sequentially and the instructions may also include rotating the projected two fine-lined patterns over each other 826 and iteratively generating new projected patterns that match a texture of the textured portion of the subject in finer detail and determining a new pattern angle and spatial frequency at each iteration until a predefined pattern knowledge is achieved 834, 836.

According to further examples, the instructions may include modifying one or more of an angle of orientation, a width, a compensation for surface coloration, and/or a three dimensional feature of the projected patterns 430, 432. A system according to example embodiments may also perform one or more of adjusting a width of lines in the projected patterns 430, 432; adjusting a linear shape of the lines of the projected patterns 430, 432 to account for curvature in a feature of the textured portion 222 of the subject; curving the projected patterns 430, 432 to account for an expected distortion based on a three dimensional contour of a surface of the textured portion 222 of the subject; and/or curving the projected patterns 430, 432 to match a detected curvature in a texture of the textured portion 222 of the subject. According to yet other examples, the instructions may include converting the Moiré patterns to a sub-resolution imputed texture map and analyzing the texture map employing a texture classification approach.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, materials, and configurations, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control modules (e.g., adjusting pattern and image capture parameters of the system).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An Augmented Reality (AR) scene capture system capable of high resolution texture extraction, the system comprising:
 a projector configured to project at least one fine-lined pattern on a three dimensional object to be captured;

a camera configured to capture an image of the object with the at least one projected pattern;
a processor configured to:
determine a textured portion of the object;
record local Moiré pattern pitches on the textured portion of the object; and
adjust one or more properties of the at least one projected pattern such that the at least one projected pattern substantially matches the textured portion of the object; and
a mobile device configured to move at least one of the camera and the projector to adjust the one or more properties of the at least one projected pattern.

2. The system according to claim 1, wherein the one or more properties of the at least one projected pattern include an angle of orientation, a width, a compensation for surface coloration, and a three dimensional feature.

3. The system according to claim 1, wherein the processor is further configured to extract a pitch and an orientation of a texture pattern of the textured portion of the object from changes in the Moiré patterns.

4. The system according to claim 1, wherein the camera and the projector are integrated into the mobile device whose motion is controlled by the processor.

5. The system according to claim 1, wherein the processor is further configured to vary the at least one projected pattern for sequential extraction of spatially varying texture on the textured portion of the object.

6. The system according to claim 1, wherein the processor is further configured to adjust the properties of the at least one projected pattern in order to capture the textured portion of the object under varying lighting conditions.

7. The system according to claim 1, wherein the at least one projected pattern includes parallel lines and the processor is further configured to adjust a linear shape of the lines to account for curvature in a feature of the textured portion of the object.

8. The system according to claim 1, wherein the processor is further configured to curve the at least one projected pattern to account for an expected distortion based on a three dimensional contour of a surface of the textured portion of the object.

9. The system according to claim 1, wherein the processor is further configured to curve the at least one projected pattern to match a detected curvature in a texture of the textured portion of the object.

10. A method for high resolution texture extraction in an Augmented Reality (AR) scene capture system, the method comprising:
determining a textured portion of a three dimensional object to be captured;
extracting a three dimensional shape for the textured portion of the object;
projecting a fine-lined pattern on the textured portion of the object;
recording local Moiré pattern images on the textured portion of the object;
selecting two or more Moiré patterns with pitches that are clear in the recorded images;
determining a pattern angle and a spatial frequency of the patterns; and
generating a new projected pattern that matches a texture of the textured portion of the object in finer detail employing the pattern angle and the spatial frequency of the patterns by moving at least one of a camera capturing the object and a projector projecting the fine-lined pattern through a mobile device.

11. The method according to claim 10, further comprising:
iteratively generating new projected patterns that match a texture of the textured portion of the object in finer detail and determining a new pattern angle and spatial frequency at each iteration until a predefined pattern knowledge is achieved.

12. The method according to claim 11, wherein the projected fine-lined patterns have a different pitch than that of a texture of the textured portion of the object providing a high frequency visual component and a low frequency visual component.

13. The method according to claim 12, wherein the high frequency visual component provides a sub-pixel resolution and the low frequency visual component provides a spatial frequency of about half a difference between spatial frequencies of the projected patterns and the texture of the textured portion of the object.

14. The method according to claim 10, further comprising:
generating a corrective matrix based on the extracted three dimensional shape for the textured portion of the object.

15. The method according to claim 10, further comprising:
rotating the projected fine-lined pattern over the textured portion.

16. A computer-readable storage medium having instructions stored thereon for high resolution texture extraction in an Augmented Reality (AR) scene capture system, the instructions comprising:
determining a textured portion of a three dimensional object to be captured;
extracting a three dimensional shape for the textured portion of the object;
projecting two fine-lined patterns on the textured portion of the object;
recording local Moiré pattern images on the textured portion of the object;
selecting two or more Moiré patterns with pitches that are clear in the recorded images;
determining a pattern angle and a spatial frequency;
rotating the projected two fine-lined patterns over each other by moving a projector projecting the fine-lined pattern through a mobile device; and
iteratively generating new projected patterns that match a texture of the textured portion of the object in finer detail by moving the projector projecting the fine-lined pattern through the mobile device and determining a new pattern angle and spatial frequency at each iteration until a predefined pattern knowledge is achieved.

17. The computer-readable storage medium according to claim 16, wherein the two projected patterns are projected sequentially.

18. The computer-readable storage medium according to claim 16, wherein the instructions further comprise:
modifying one or more of an angle of orientation, a width, a compensation for surface coloration, or a three dimensional feature of the projected patterns by moving the projector projecting the fine-lined pattern through the mobile device.

19. The computer-readable storage medium according to claim 16, wherein the instructions further comprise performing one or more of:
adjusting a width of lines in the projected patterns;
adjusting a linear shape of the lines of the projected patterns to account for curvature in a feature of the textured portion of the object;
curving the projected patterns to account for an expected distortion based on a three dimensional contour of a surface of the textured portion of the object; or curving the projected patterns to match a detected curvature in a texture of the textured portion of the object.

20. The computer-readable storage medium according to claim 16, wherein the instructions further comprise:
converting the Moiré patterns to a sub-resolution imputed texture map; and
analyzing the texture map employing a texture classification approach.

* * * * *

UNITED STATES PATENT AND TRADEMARK OFFICE
CERTIFICATE OF CORRECTION

Page 1 of 1

PATENT NO. : 8,532,340 B2
APPLICATION NO. : 13/061677
DATED : September 10, 2013
INVENTOR(S) : Kruglick It is certified that error appears in the above-identified patent and that said Letters Patent is hereby corrected as shown below:

On Title Page 2, in Item (56), under "OTHER PUBLICATIONS", in Column 1, Line 1, delete "moire" and insert -- moiré --, therefor.

In the Specification

In Column 3, Line 16, delete "hereof" and insert -- hereof. --, therefor.

In Column 12, Line 5, delete "processor 910" and insert -- processor 710 --, therefor.

In Column 12, Line 17, delete "processor 910." and insert -- processor 710. --, therefor.

In Column 12, Line 27, delete "processor 910" and insert -- processor 710 --, therefor.

In Column 12, Line 32, delete "processor 910." and insert -- processor 710. --, therefor.

In Column 16, Line 40, delete "thereof" and insert -- thereof. --, therefor.

Signed and Sealed this
Twenty-ninth Day of April, 2014

Michelle K. Lee
*Deputy Director of the United States Patent and Trademark Office*